(12) United States Patent
Gracyalny et al.

(10) Patent No.: US 12,275,590 B2
(45) Date of Patent: Apr. 15, 2025

(54) CLIP FOR REMOVABLY SECURING A STRAP TO A FRAME

(71) Applicant: Expert Engineering Solutions, Saukeville, WI (US)

(72) Inventors: Gary J. Gracyalny, Elm Grove, WI (US); Daniel S. Kelly, Sheboygan, WI (US); Kimberly J. Coticchia, Gratfon, WI (US)

(73) Assignee: EXPERT ENGINEERING SOLUTIONS, Saukeville, WI (US)

( * ) Notice: Subject to any disclaimer, the term of this patent is extended or adjusted under 35 U.S.C. 154(b) by 36 days.

(21) Appl. No.: 18/335,590

(22) Filed: Jun. 15, 2023

(65) Prior Publication Data

US 2023/0406641 A1 Dec. 21, 2023

Related U.S. Application Data

(60) Provisional application No. 63/353,176, filed on Jun. 17, 2022.

(51) Int. Cl.
*B65G 1/14* (2006.01)

(52) U.S. Cl.
CPC ..................... *B65G 1/14* (2013.01)

(58) Field of Classification Search
CPC ..... B65G 1/14; A47B 2097/008; A47B 57/22; A47B 57/20; A47B 96/00; A47B 96/06; A47F 5/101; F16B 21/09; F16B 37/043
USPC .......................... 248/218.4, 221.12, 222.41, 248/220.41–220.43, 499–500, 507; 24/265 R–265 CD; 410/105
See application file for complete search history.

(56) References Cited

U.S. PATENT DOCUMENTS

| | | | | |
|---|---|---|---|---|
| 3,319,917 A | * | 5/1967 | Bilodeau | A47G 25/0678 248/303 |
| 4,405,110 A | * | 9/1983 | Gibbons | A47F 5/0823 248/220.22 |
| 5,114,203 A | * | 5/1992 | Carnes | F16B 21/09 296/57.1 |
| 6,142,435 A | * | 11/2000 | Lodi | H05K 7/142 248/221.12 |
| 7,510,318 B2 | * | 3/2009 | Chen | G02F 1/133608 362/633 |
| 8,911,191 B2 | * | 12/2014 | James | B64C 1/06 411/84 |
| 9,083,169 B2 | * | 7/2015 | James | F16B 37/043 |
| 10,583,809 B2 | * | 3/2020 | Kuchly | B60S 1/043 |
| 2002/0100147 A1 | * | 8/2002 | Larsen | H05K 5/0204 24/298 |

(Continued)

*Primary Examiner* — Christopher Garft
(74) *Attorney, Agent, or Firm* — Peigen Jiang; Greenberg Traurig, LLP (57) ABSTRACT

An apparatus for securing a strap to a frame having a first and second opening is disclosed which includes an elongated body having a top, a flexible and a middle portion along an elongated direction in a top-to-bottom order, the middle portion to be used for holding a loop formed by the strap, a first latching member protruding from the elongated body above the middle portion and below the flexible portion in a first direction for removably latching into the first opening, and a second latching member protruding from the elongated body below the middle portion in the first direction for removably latching into the second opening.

17 Claims, 12 Drawing Sheets

(56) References Cited

U.S. PATENT DOCUMENTS

| | | | | |
|---|---|---|---|---|
| 2002/0153340 A1* | 10/2002 | Denny | ............... | F16B 12/34 |
| | | | | 211/180 |
| 2011/0139953 A1* | 6/2011 | Wittke | ............... | F16B 21/09 |
| | | | | 248/323 |
| 2015/0129524 A1* | 5/2015 | Cushion | ............... | A61L 2/00 |
| | | | | 29/466 |

* cited by examiner

CLIP FOR REMOVABLY SECURING A STRAP TO A FRAME

BACKGROUND

The present disclosure relates generally to the field of racking systems, and, more particularly, to clips that secure straps to frames of a rack.

Large warehouses normally store goods in a racking system which includes layers of shelves adjustably mounted to a rack extending several meters tall. An advantage of such racking system is that the vertical space of the warehouses can be fully utilized. However, goods stored in such racking system may suffer the danger of falling off the shelf in an event of earthquake or an accidental push. Goods falling off from a high-rise shelf may pose danger to human operators.

As such what is desired is a fencing device that can prevent goods from falling off a shelf of a racking system and can be easily removed to allow for restocking the shelf.

The drawings accompanying and forming part of this specification are included to depict certain aspects of the disclosure. A clearer conception of the disclosure, and of the components and operation of systems provided with the disclosure, will become more readily apparent by referring to the exemplary, and therefore non-limiting, embodiments illustrated in the drawings, wherein like reference numbers (if they occur in more than one view) designate the same elements. The disclosure may be better understood by reference to one or more of these drawings in combination with the description presented herein.

DESCRIPTION

The present disclosure relates to a clip for securing a strap to a frame of a racking system to provide a fence therefor. Preferred embodiments of the present disclosure will be described hereinafter with reference to the attached drawings.

Figure 1A:
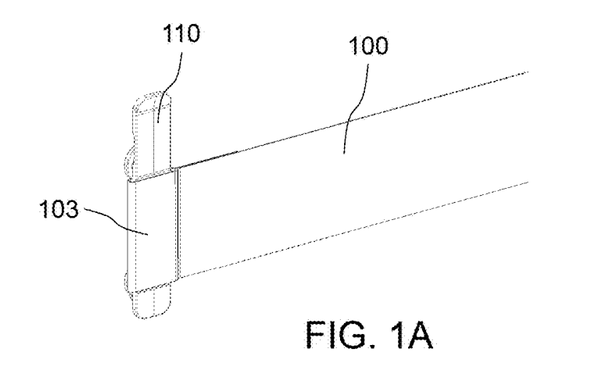
FIGS. 1A and 1B are perspective views of a clip-and-strap system attached to a frame in accordance with an embodiment of the present disclosure.
Figure 1B:
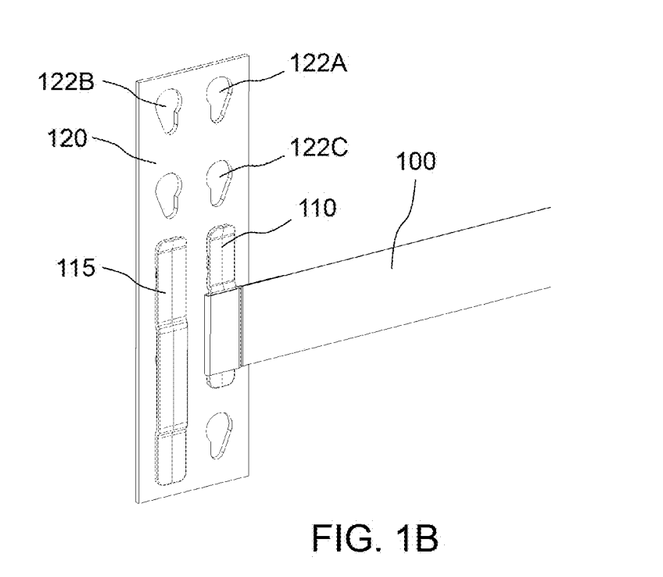

FIGS. 1A and 1B are perspective views of a clip-and-strap system attached to a frame in accordance with an embodiment of the present disclosure.

Referring to FIG. 1A, a strap 100 forms a loop 103 wrapping around a clip 110, so that the strap 100 is removably secured to the clip 110.

FIG. 1B illustrates the clip 110 is attached to a frame 120 through openings (covered by the clip 110) similar to openings 122A-122C. In an example, the frame 120 has a first plurality of openings (122A and 122C, etc.) evenly distributed in a vertical direction, so that the clip 110 can be attached to any two vertically adjacent openings such as the openings 122A and 122C. In another example, the frame 120 has second plurality of openings including opening 122B evenly distributed in the vertical direction. The first and second plurality of openings are next to each other, and exemplarily horizontally aligned, for example, the opening 122A is horizontally aligned with opening 122B.

As shown in FIG. 1B, the first plurality of openings 122A, etc. is used for securing the strap 100 extending to the right hand side, while the second plurality of openings 122B, etc. is used for securing a strap (not shown) extending to the left hand side.

FIG. 1B also illustrates another clip 115 attached to the frame 120 spanning over three vertically aligned openings (covered by the clip 115). With the longer clip 115, a wider strap (not shown) can be used. In other embodiments, a clip can be sized to span over both vertically and horizontally aligned openings, so that the clip can be more strongly secured to the frame 120.

Figure 2A:
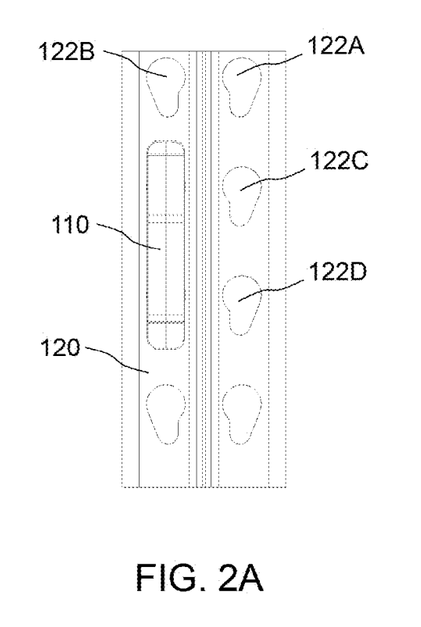
FIGS. 2A and 2B are perspective views of the clip in accordance with an embodiment of the present disclosure.
Figure 2B:
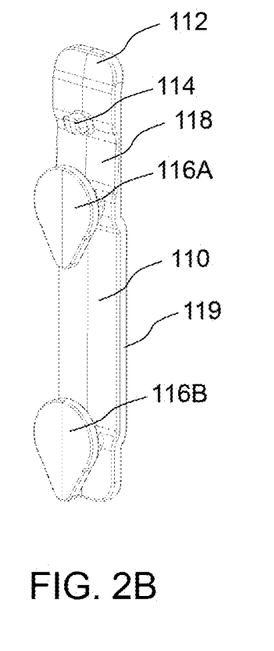

FIGS. 2A and 2B are perspective views of the clip 110 in accordance with an embodiment of the present disclosure.

FIG. 2A illustrates a front side of the elongated clip 110 secured to the frame 120 through openings (not shown) symmetrical to the openings 122C and 122D. The openings 122A-122D are identical in size and shape except that a first vertically aligned array of openings (including 122A) is symmetrical to a second vertically aligned array of openings (including 122B). An exemplary opening 122A is shaped like two overlapped circles with the upper one having larger diameter than the lower one. However, the centers of the circles are not vertically aligned. In an embodiment, the center line of the small circles is slightly off to the left of the center line of the large circles for the first vertically aligned array of openings (including 122A); and the center line of the small circles is slightly off to the right of the center line of the large circles for the second vertically aligned array of openings (including 122B).

Although the opening 122A-122D is described as two overlapped circles above, the contour of the opening 122A-122D is smoothed out so that an object can slide smoothly between the circles.

FIG. 2B illustrate a back side of the clip 110 with a protruding knob 114 and two protruding buttons 116A and 116B. The knob 114 is located above the upper button 116A by a predetermined distance, so that both the knob 114 and the upper button 116A can be inserted in the opening 122A while the lower button 116B can be inserted in the opening 122D. In an embodiment, buttons 116A and 116B are identical in shape and size and have the same orientation, and are shaped like two overlapping circles with a diameter of the upper circle larger than that of the lower circle. The upper circle of the button 116A is slightly smaller than the upper circle of the opening 122C but larger than the lower circle of the opening 122C, so that the button 116A can be inserted in the opening 122C through the upper circle of the opening 122C. When the button 116A slides downward, the lower circle of the opening 122C can block the button 116A from being pulled out of the opening 122C. As button 116A and 116B are spaced apart by the same distance as that of the openings 122C and 122D, when the button 116A is inserted and locked in the opening 122C, the button 116B is similarly inserted and locked in the opening 122D. When both buttons 116A and 116B are in the locked position, the knob 114 is also inserted in the opening 122C against an upper edge of the opening 122C. In this way, the knob 114 prevents the clip 110 from moving upward, and the buttons 116A and 116B prevents the clip 110 from moving downward and outward, so that the clip 110 is secured to the frame 120.

As shown in FIG. 2B, a top portion 112 of the clip 110 above the knob 114 has a slanted surface toward the front of the clip 110 to allow a finger to pull the top portion 112 away from the frame 120 when the clip 110 is flat on the frame 120 in the locked position. In an embodiment, the clip 110 is made of a plastic material which is slightly flexible, so that the top portion 112 has enough travel when pulled to allow the knob 114 to come out of the opening 122C while the button 116A is stilled locked by the opening 122C. When the knob 114 is out of the opening 122C, the clip can slide upward to allow the buttons 116A and 116B to dislodge from the openings 122C and 122D, respectively. In an embodiment, a flexible portion 118 of the clip 110 is made thinner than the rest of the clip 110 to make bending at the flexible portion 118 easier without losing the rigidity of the clip 110 in the vertical direction.

As shown in FIG. 2B, a middle portion 119 of the clip 110 has a bend at each end thereof, so that the middle portion 119 is raised above the bottom surface of the clip 110. The middle portion 119 is raised by an amount at least more than a thickness of the strap 100 to allow a layer of the strap 100 to go between the clip 110 and the frame 120 when the former is securely attached to the latter. As an example, the middle portion 119 is slightly longer than a width of the strap 100 for allowing the strap 100 to smoothly wrap around the middle portion 119. However, as the strap 100 can be made of a flexible material such as a fabric, the middle portion 119 can instead be slightly shorter than a width of the strap 100 in another example.

Although the buttons 116A and 116B as described above are distanced by one vertical pitch of the openings which is a distance between the openings 122C and 122D, in other embodiments, the distance of the buttons 116A and 116B can be two or more numbers of pitches of the openings 122A-122D. In a case of two pitches as embodied by the clip 115 shown in FIG. 1B, the button 116A would be inserted in the opening 122A while the button 116B would be inserted in the opening 122D, and the middle portion 119 would be longer to accommodate a wider strap 100.

Figure 3A:
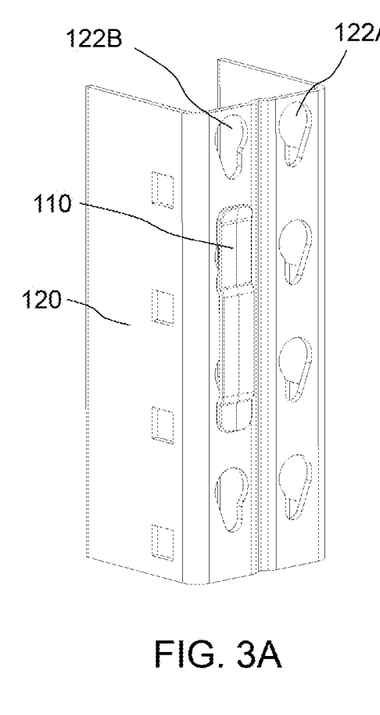
FIGS. 3A and 3B are two different views of the clip attached to the frame in accordance with an embodiment of the present disclosure.
Figure 3B:
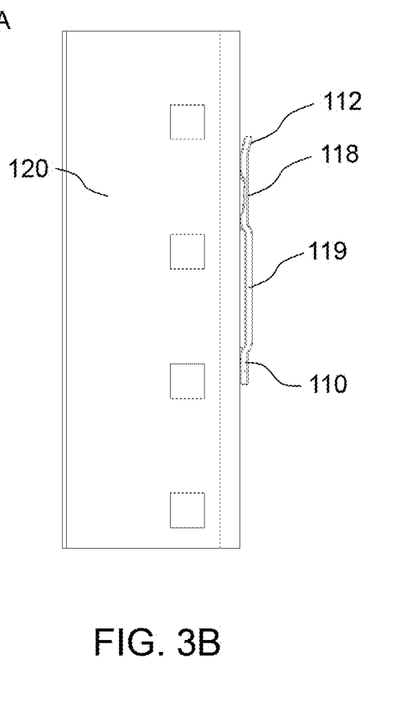

FIGS. 3A and 3B are two different views of the clip 110 attached to the frame 120 in accordance with an embodiment of the present disclosure.

FIG. 3A is a perspective view showing that the frame 120 has a U-shaped cross-section with the openings 122A and 122B, etc., made to the bottom of the U, and the clip 110 secured to two of the openings (covered by the clip 110).

FIG. 3B is a side view of the clip 110 secured to the frame 120. The side view particularly shows the slanted top portion 112, the thinner flexible portion 118 and the raised middle portion 119 as described above.

Figure 4:
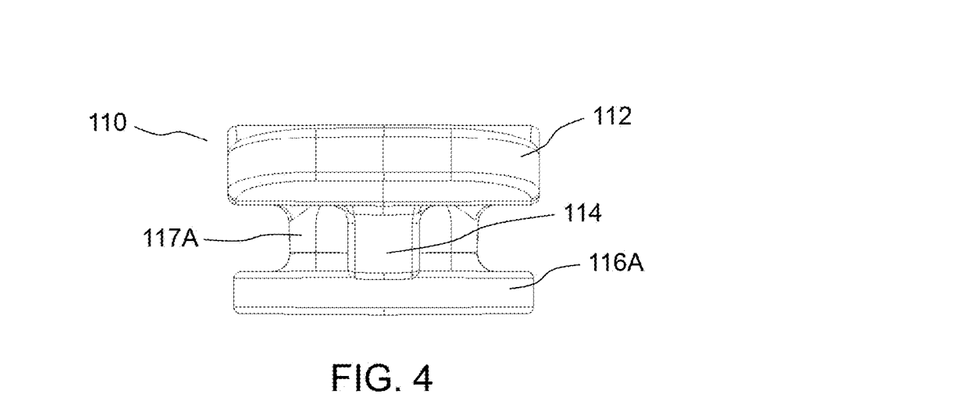
FIG. 4 is a top side view of the clip in accordance with an embodiment of the present disclosure.

FIG. 4 is a top side view of the clip 110 in accordance with an embodiment of the present disclosure. The top portion 112 has a surface slanted away from the back surface of the clip 110. The knob 114 protrudes from the back surface of the clip 110. The button 116A is connected to the back surface of the clip 110 through a neck 117A. A width of neck 117A is narrower than a diameter of the lower circle of the opening 122C shown in FIG. 2A, so that the neck 117A can fit in the lower circle of the opening 122C when the clip 110 slides downward into the locking position. In an embodiment, a height of the neck 117A is slightly higher than a thickness of the frame 120, so that a wall of the frame 120 (not shown in FIG. 4) snuggly fits in a gap between the back surface of the clip 110 and the button 116A.

Figure 5:
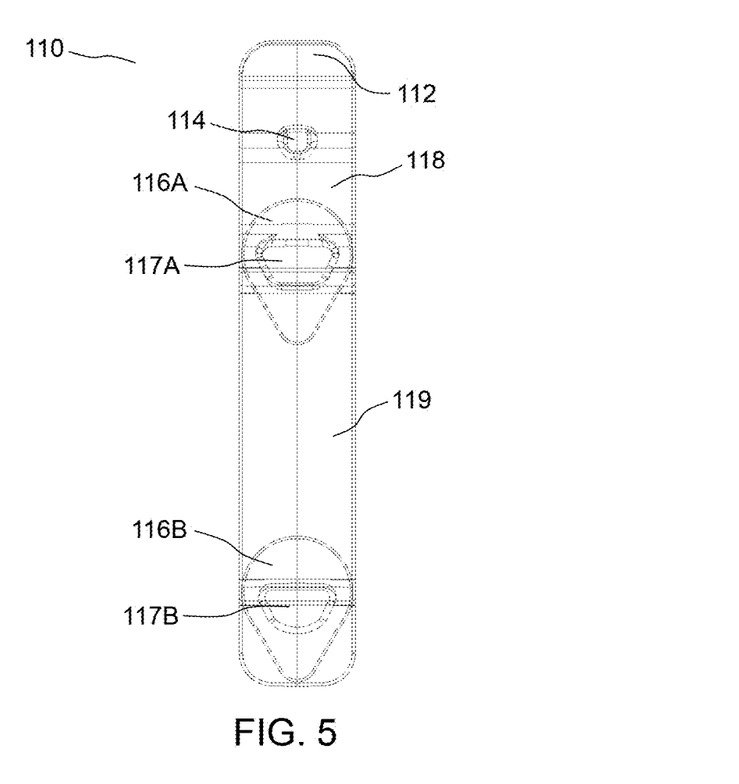
FIG. 5 is an exploded view of the back side of the clip in accordance with an embodiment of the present disclosure.

FIG. 5 is an exploded view of the back side of the clip 110 in accordance with an embodiment of the present disclosure. As shown in FIG. 5, the neck 117A is exemplarily centered on the button 116A with a width narrower than the diameter of the upper circle of the button 116A. A neck 117B similarly connects the button 116B to the back surface of the clip 110. The neck 117B is exemplarily centered on the button 116B with a width narrower than the diameter of the upper circle of the button 116B. In an embodiment, a distance between the neck 117A and 117B matches one pitch of the openings 122C and 122D, so that when the neck 117A fits in the lower circle of the opening 122C, the neck 117B fits in the lower circle of the opening 122D.

FIGS. 6A-6D are side and cross-sectional views of the clip 110 in accordance with an embodiment of the present disclosure.

Figures 6A, 6B, 6C:
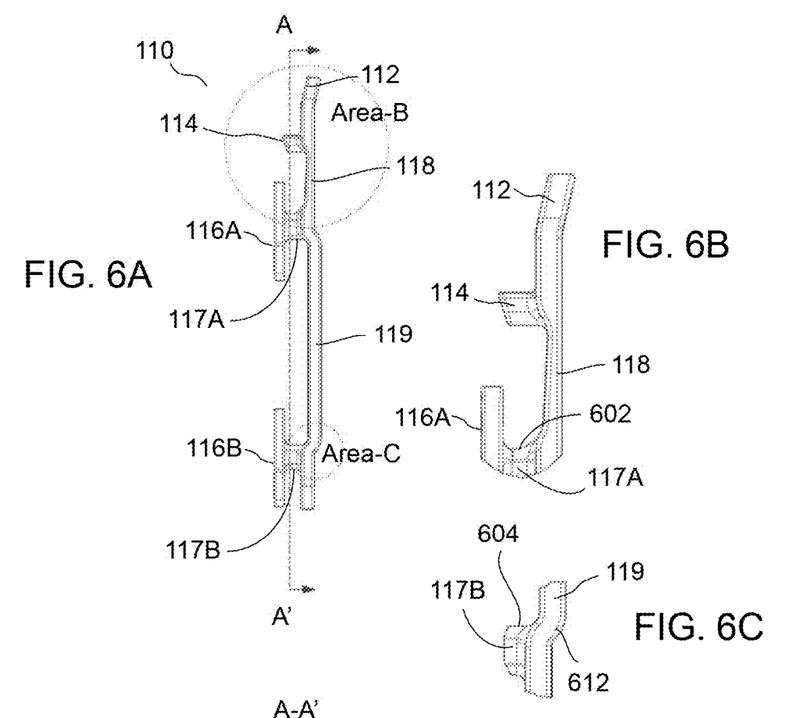
FIGS. 6A-6D are side and cross-sectional views of the clip in accordance with an embodiment of the present disclosure.

FIG. 6A is a side view of the clip 110 showing two areas, Area-B and Area-C, to be enlarged and a cross-section line A-A'.

FIG. 6B shows Area-B of FIG. 6A. The top portion 112 of the clip 110 is slanted frontward. The top surface of the knob 114 is backward, i.e., a lower edge of the knob 114 is closer to the back surface than the upper edge of the knob 114. With the backward slant, the knob 114 can be easily inserted in the opening 122C when the clip 110 slides downward.

As shown in FIG. 6B, the neck 117A has a sloped sidewall 602, so that a base portion of the neck 117A is wider than a top portion of the neck 117A. The wider base portion of the neck 117A enhances structural strength of the flexible portion 118 which is made thinner than the top portion 112 of the clip 110.

FIG. 6C shows Area-C of FIG. 6A. The neck 117B has a straight sidewall 604. There is a bend 612 at the lower end of the middle portion 119, so that the middle portion 119 leaves a gap between the back surface of the clip 110 and the middle portion 119 for accommodating the strap 100.

In an embodiment, the middle portion 119 has a hollowed space (not shown) for inserting the strap 100. There may be spikes on a side wall of the hollowed space for holding the strap 100 in place.

Figure 6D:
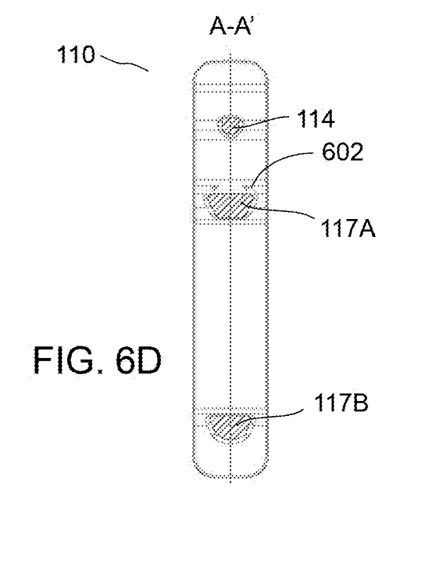

FIG. 6D is a cross-sectional view of the clip 110 at A-A' location. The cross-sectional view shows the knob 114, and the necks 117A and 117B. The cross-sectional view also reveals the sloped sidewall 602 of the neck 117A. In an embodiment, the sloped sidewall 602 is only located at edges of the neck 117A, and a middle section of the neck 117A still has a straight sidewall.

Figure 7A:
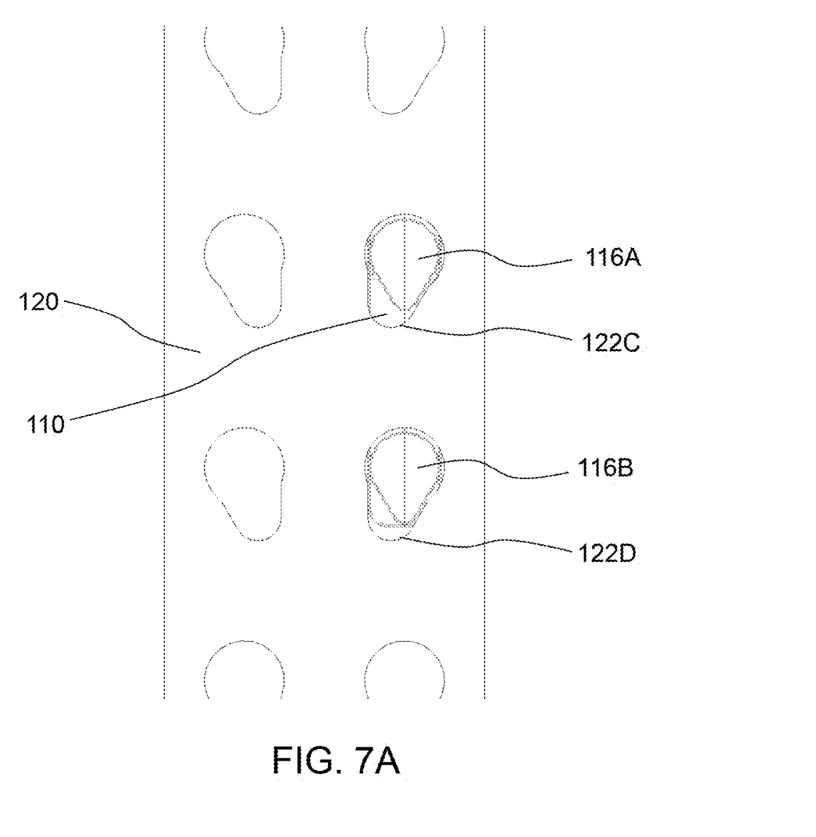
FIGS. 7A-7C illustrate how the clip engages the frame in accordance with an embodiment of the present disclosure.
Figure 7B:
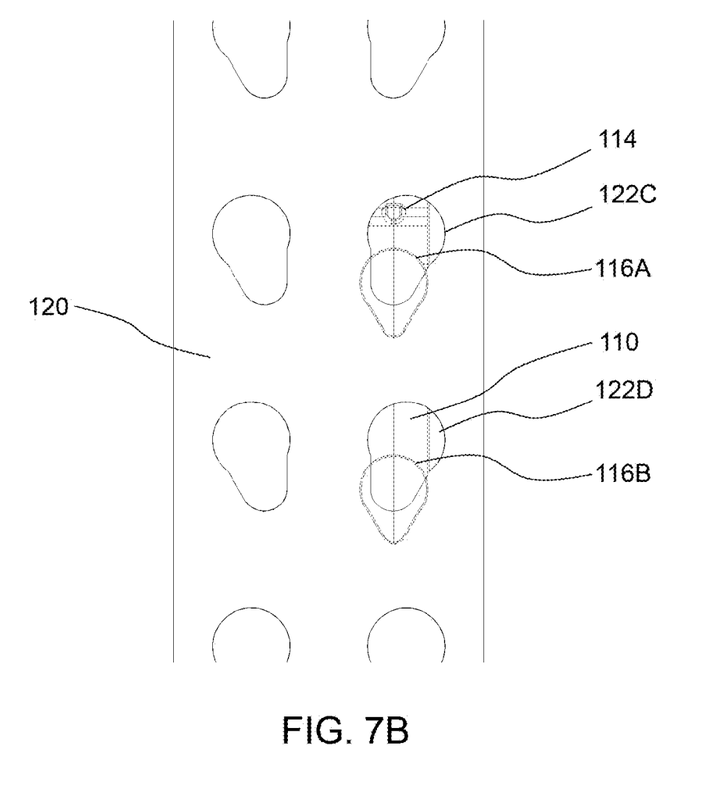
Figure 7C:
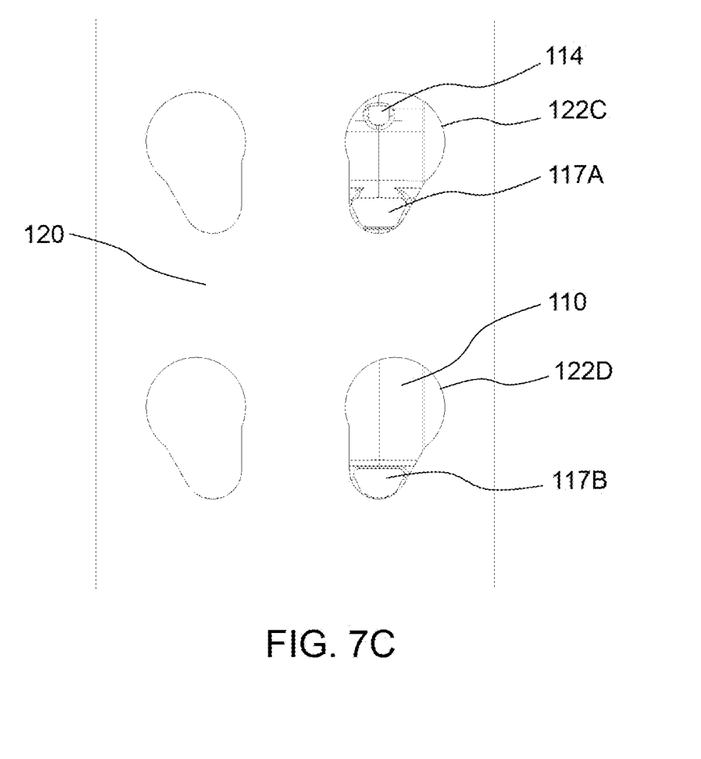

FIGS. 7A-7C illustrate how the clip 110 engages the frame 120 in accordance with an embodiment of the present disclosure.

FIG. 7A illustrates the upper button 116A fits into the upper portion of the opening 122C while the lower button 116B fits into and through the upper portion of the opening 122D. In an embodiment, a contour of the upper edge of the button 116A approximately matches a contour of the upper edge of the opening 122C, so that the button 116A snuggly fits into the opening 122C.

In embodiments, the buttons 116A and 116B are identical in shape and size, and openings 122C and 122D in the same vertical aligned array are identical in shape and size, so that the clip 110 can be attached to any two vertically adjacent openings in the frame 120.

FIG. 7B illustrates the clip 110 slid downward with the upper button 116A overlaps the lower portion of the opening 122C while the lower button 116B overlaps the lower portion of the opening 122D. As the diameter of the buttons 116A or 116B is larger than the width of the lower portion of the opening 122C or 122D, the buttons 116A and 116B prevent the clip 110 to move away from the frame 120. In this position, the knob 114 falls in the opening 122C. The upper edge of the opening 122C prevents the knob 114 and hence the clip 110 from moving upward. In an embodiment, a clip (not shown) spans over three adjacent openings, 122E, 122C and 122D, the knob 114, in this case, falls in the opening 122E instead while the buttons 116A and 116B remain inserted through the openings 122C and 122D, respectively.

FIG. 7C illustrates the neck 117A snuggly fits in the lower portion of the opening 122C while the neck 117B snuggly fits in the lower portion of the opening 122D. The knob 114 is positioned near the upper edge of the opening 122C. In an embodiment, a contour of the lower edge of the neck 117A approximately matches a contour of the lower edge of the opening 122C. Similarly, a contour of the lower edge of the neck 117B approximately matches a contour of the lower edge of the opening 122D.

As shown in FIG. 7C, the knob 114 and the neck 117A are spaced apart to match the openings 122C with the knob 114 touches the upper edge of the opening 122C and the neck 117A touches the lower edge of the opening 122C.

Figure 8:
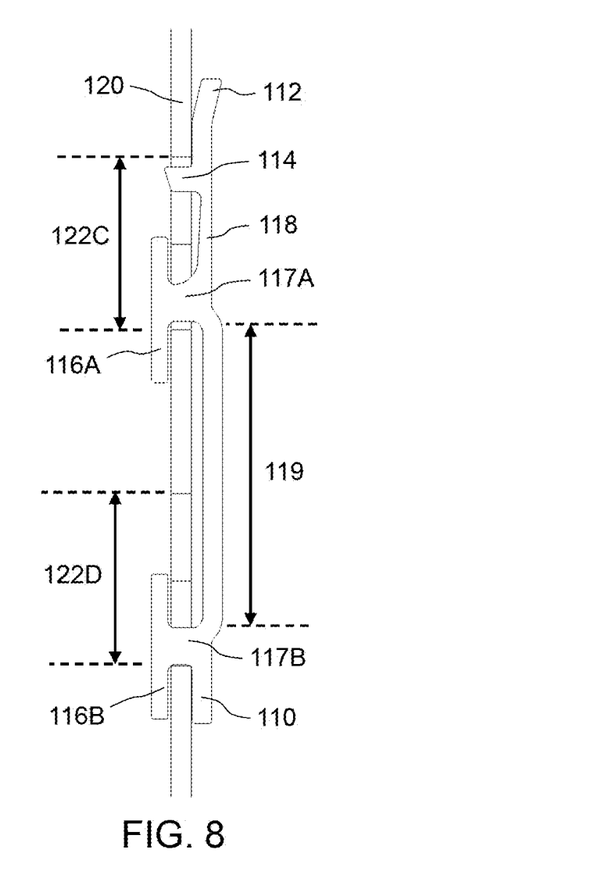
FIG. 8 is a side cross-sectional view of the clip secured by the frame in accordance with an embodiment of the present disclosure.

FIG. 8 is a side cross-sectional view of the clip 110 secured by the frame 120 in accordance with an embodiment of the present disclosure. As shown in FIG. 8, the buttons 116A and 116B are on left hand side of the frame 120 and the elongated body of the clip 110 is on the right hand side of the frame 120. The elongated body of the clip 110 includes the top slanted portion 112, the thinned flexible portion 118 and the raised middle portion 119.

As shown in FIG. 8, the lower portion of each of the buttons 116A and 116B overlaps the frame 120, so that the buttons 116A and 116B cannot move toward the right in the secured position shown in FIG. 8. The button 116A is connected to the elongated body of the clip 110 by the first neck 117A. The button 116B is connected to the elongated body of the clip 110 by the second neck 117B. In an embodiment, a length of the first neck 117A is approximately the same as that of the second neck 117B and is slightly longer than a thickness of frame 120 which has a uniform thickness in a vicinity of the clip mounting region.

As shown in FIG. 8, the knob 114 protruding from the elongated body of the clip 110 and the first neck 117A are situated in the opening 122C of the frame 120. The second neck 117B is situated in the opening 122D of the frame 120. The upper edge of the opening 122C prevents the knob 114 from moving upward to lock the clip 110 in the secured position shown in FIG. 8. To remove the clip 110, a finger can pull the slanted top portion 112 along with the knob 114 away from the frame 120. When the knob 114 is pulled completely out of the opening 122C, the clip 110 can slide upward to allow the buttons 116A and 116B to be pulled out of the openings 122A and 122B, respectively.

FIGS. 9A-9D illustrate the strap 100 being fastened to the clip 110 in accordance with an embodiment of the present disclosure.

Figure 9A:
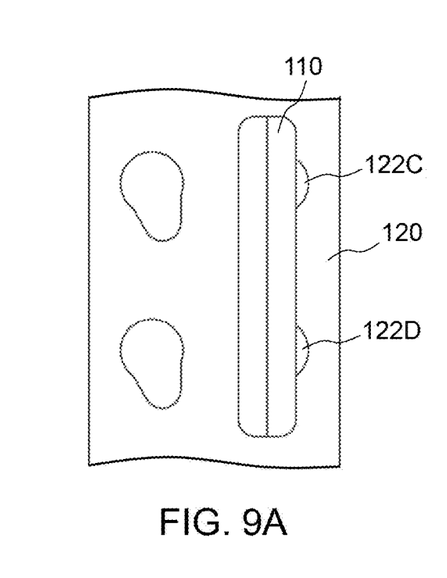
FIGS. 9A-9D illustrate the strap being fastened to the clip in accordance with an embodiment of the present disclosure.

FIG. 9A illustrates the clip 110 being secured to openings 122C and 122D of the frame 120.

Figure 9B:
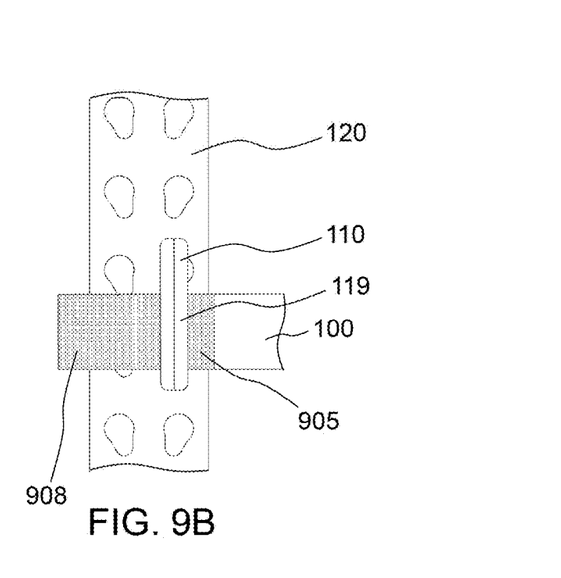

FIG. 9B illustrates the strap 100 having an end section inserted in the gap between the middle portion 119 of the clip 110 and the frame 120. In an embodiment, the end section of the strap 100 has a first portion 905 covered by a plurality of loops and a second portion 908 covered by a plurality of hooks.

Figure 9C:
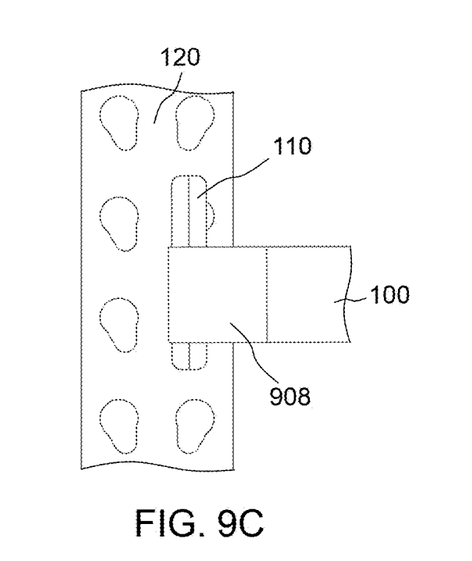

FIG. 9C illustrates that the second portion 908 is folded over the front of the middle portion 119 of the clip 110 to overlap the first portion 905 (covered by the second portion 908). When pressed, the loops on the first portion 905 engage the hooks on the second portion 908 to firmly bond the second portion 908 to the first portion 905 to form a loop around the middle portion 119 for securing the strap 100 to the clip 110. In another embodiment, the first portion 905 is covered by a plurality of hooks while the second portion 908 is covered by a plurality of loops. The loop-and-hook locking mechanism to form a loop remains the same. When the strap 100 is to be separated from the clip 110, a user can pull the second portion 908 off the first portion 905 to disengage the plurality of loops and the plurality of hooks.

Figure 9D:
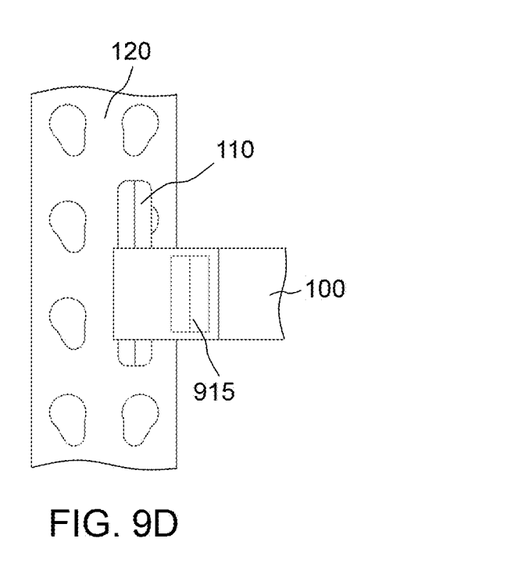

FIG. 9D illustrates an alternative strap looping mechanism. As shown in FIG. 9D, an end section of the strap 100 loops around the middle section 119 (not shown) of the clip 110 and is sewed to the main section of the strap 100 at a location 915. In another embodiment, the end section of the strap 100 can be riveted to the main section of the strap 100 to form a loop around the middle portion 119 of the clip 110. In embodiments, the strap 100 is made of an elastic material, so that the strap 100 can be removed from the clip 110 even when the loop is formed by either sewing or riveting.

Figure 10:
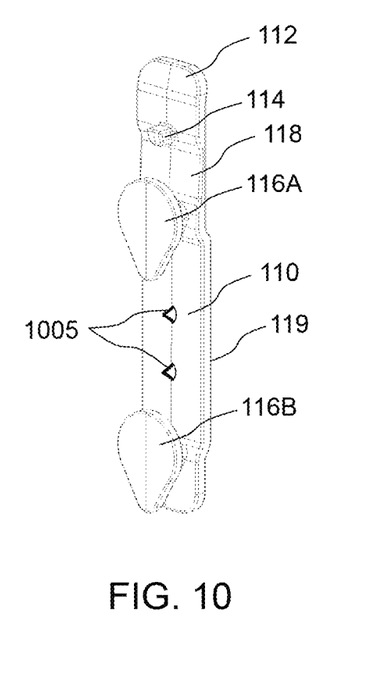
FIG. 10 shows the clip having a plurality of spikes in accordance with an embodiment of the present disclosure.

FIG. 10 shows the clip 110 having a plurality of spikes 1005 in accordance with an embodiment of the present disclosure. The plurality of spikes 1005 are exemplarily located on the back side of the middle portion 119 of the clip 110 for pinching the strap 100 (not shown) against the frame 120. In another example, spikes may be provided on both side edges of the middle portion 119, so that the strap 100 adheres securely to the middle portion 119 of the clip 110.

Figure 11:
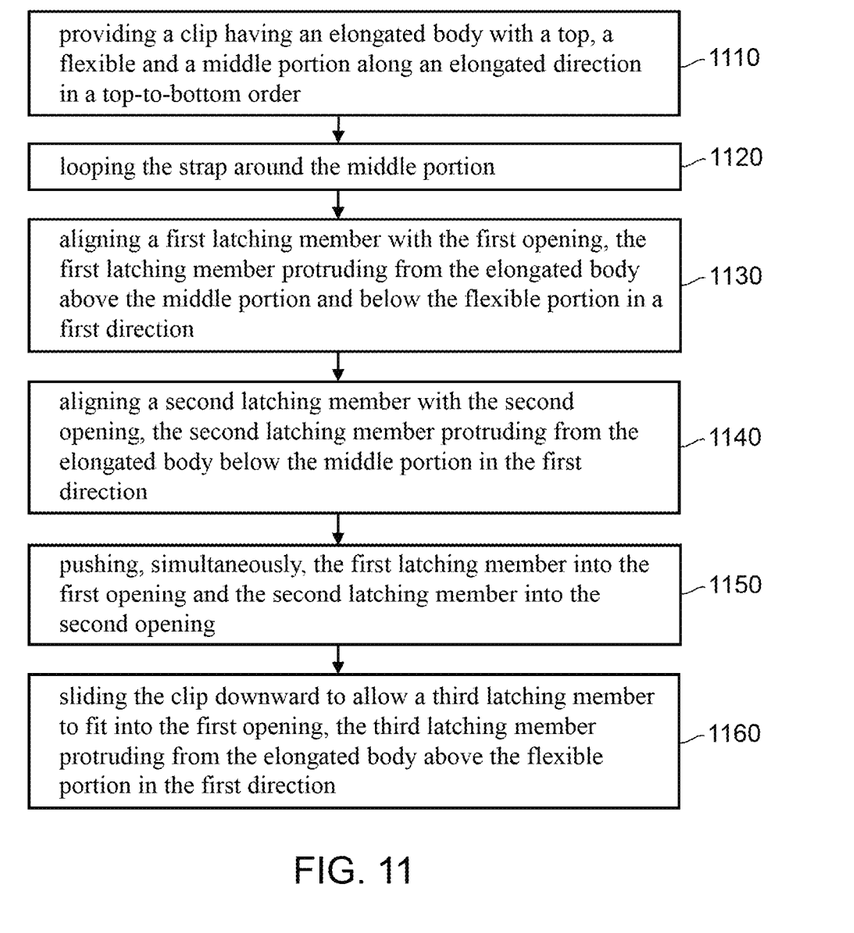
FIG. 11 is a flow chart illustrating an operation of the clip-strap system in accordance with an embodiment of the present disclosure.

FIG. 11 is a flow chart illustrating an operation of the clip-strap system in accordance with an embodiment of the present disclosure. The operation of securing a strap to a frame having a first and second opening begins with providing, in step 1110, a clip having an elongated body with a top, a flexible and a middle portion along an elongated direction in a top-to-bottom order. In step 1120, the operation includes looping the strap around the middle portion. In step 1130, the operation includes aligning a first latching member with the first opening, the first latching member protruding from the elongated body above the middle portion and below the flexible portion in a first direction. In step 1140, the operation includes aligning a second latching member with the second opening, the second latching member protruding from the elongated body below the middle portion in the first direction. In step 1150, the operation includes pushing, simultaneously, the first latching member into the first opening and the second latching member into the second opening. In step 1160, the operation includes sliding the clip downward to allow a third latching member to fit into the first opening, the third latching member protruding from the elongated body above the flexible portion in the first direction.

Although the disclosure is illustrated and described herein as embodied in one or more specific examples, it is nevertheless not intended to be limited to the details shown, since various modifications and structural changes may be made therein without departing from the spirit of the disclosure and within the scope and range of equivalents of the claims. Accordingly, it is appropriate that the appended claims be construed broadly and, in a manner, consistent with the scope of the disclosure, as set forth in the following claims.

What is claimed is:

1. An apparatus for securing a strap to a frame having a first and second opening, the apparatus comprising:
   an elongated body having a top, a flexible and a middle portion along an elongated direction in a top-to-bottom order, the middle portion forming a gap between the middle portion and the frame by bending the middle portion away from a surface of the elongated body that contacts the frame when the elongated body is secured to the frame, the middle portion to be used for holding a loop formed by the strap;
   a first latching member protruding, in a first direction, from the elongated body above the middle portion and below the flexible portion for removably latching into the first opening; and
   a second latching member protruding, in the first direction, from the elongated body below the middle portion for removably latching into the second opening.

2. The apparatus of claim 1 further comprising a third latching member protruding, in the first direction, from the elongated body above the flexible portion and spaced apart from the first latching member by a predetermined distance, wherein both the third latching member and the first latching member are inserted in the first opening.

3. The apparatus of claim 2, wherein the flexible portion is thinner than the top portion, wherein the thinner flexible portion bends to release the third latching member from the first opening.

4. The apparatus of claim 1, wherein the top portion has a surface slanted away from a surface of the elongated body that contacts the frame when the elongated body is secured to the frame.

5. The apparatus of claim 1, wherein the first latching member includes a first button and a first neck connecting the first button to the elongated body with the first button being wider than the first neck, and the first neck having a first length longer than a first thickness of the frame in a vicinity of the first opening.

6. The apparatus of claim 5, wherein the first button is narrower than a first area of the first opening but wider than a second area of the first opening, and the first neck is narrower than the second area of the first opening.

7. The apparatus of claim 6, wherein a contour of an upper edge of the first button matches a contour of an upper edge of the first area of the first opening.

8. The apparatus of claim 6, wherein a contour of a lower edge of the first neck matches a contour of a lower edge of the second area of the first opening.

9. The apparatus of claim 1, wherein the second latching member includes a second button and a second neck connecting the second button to the elongated body with the second button being wider than the second neck, and the second neck having a second length longer than a second thickness of the frame in a vicinity of the second opening.

10. The apparatus of claim 9, wherein the second button is narrower than a first area of the second opening but wider than a second area of the second opening, and the second neck is narrower than the second area of the second opening.

11. The apparatus of claim 1 further comprising a spike protruding from the middle portion into the gap for pinching the strap.

12. The apparatus of claim 11 further comprising a spike protruding from the middle portion into the gap for pinching the strap.

13. The apparatus of claim 1 further comprising a fastener for securing the strap to the middle portion.

14. The apparatus of claim 13, wherein the fastener includes a plurality of hooks on a first section of the strap and a plurality of loops on a second section of the strap, wherein when the first section is pressed against the second section, the plurality of hooks and the plurality of loops form a bond between the first section and the second section with a section of the strap between the first and second section forming a loop around the middle portion.

15. The apparatus of claim 13, wherein the fastener is provided by either sewing or riveting.

16. The apparatus of claim 1, wherein the strap is made of an elastic material.

17. A method for securing a strap to a frame having a first and second opening, the method comprising:
   providing a clip having an elongated body with a top, a flexible and a middle portion along an elongated direction in a top-to-bottom order;
   looping the strap around the middle portion;
   aligning a first latching member with the first opening, the first latching member protruding, in a first direction, from the elongated body above the middle portion and below the flexible portion;
   aligning a second latching member with the second opening, the second latching member protruding, in the first direction, from the elongated body below the middle portion;
   pushing, simultaneously, the first latching member into the first opening and the second latching member into the second opening; and
   sliding the clip downward to allow a third latching member to fit into the first opening, the third latching member protruding, in the first direction, from the elongated body above the flexible portion.

* * * * *